US010611011B2

United States Patent
Nitsche et al.

(10) Patent No.: US 10,611,011 B2
(45) Date of Patent: Apr. 7, 2020

(54) HAND-HELD POWER TOOL (71) Applicant: Robert Bosch GmbH, Stuttgart (DE)

(72) Inventors: Rainer Nitsche, Kirchheim/Teck (DE);
Thomas Winkler, Stuttgart (DE);
Christian Bertsch, Markgroeningen
(DE); Achim Duesselberg, Kirchheim
Unter Teck (DE); Ulli Hoffmann,
Niefern-Oeschelbronn (DE); **Helge
Sprenger**, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 716 days.

(21) Appl. No.: 14/403,215

(22) PCT Filed: Apr. 3, 2013

(86) PCT No.: PCT/EP2013/056986
§ 371 (c)(1),
(2) Date: Nov. 24, 2014

(87) PCT Pub. No.: WO2013/174557
PCT Pub. Date: Nov. 28, 2013

(65) Prior Publication Data
US 2015/0158170 A1 Jun. 11, 2015

(30) Foreign Application Priority Data

May 25, 2012 (DE) .......................... 10 2012 208 855

(51) Int. Cl.
*B25D 17/00* (2006.01)
*B23Q 17/00* (2006.01)
*B25D 17/24* (2006.01)

(52) U.S. Cl.
CPC ............. *B25D 17/00* (2013.01); *B23Q 17/00* (2013.01); *B25D 17/24* (2013.01); *B25D 2250/201* (2013.01); *B25D 2250/221* (2013.01)

(58) Field of Classification Search
CPC .. B25D 17/00; B25D 17/24; B25D 2250/201; B23Q 17/00; B25B 2250/221
(Continued)

(56) References Cited

U.S. PATENT DOCUMENTS 4,254,354 A * 3/1981 Keem ................... G01L 23/222
310/321
5,277,261 A * 1/1994 Sakoh ..................... B25B 21/02
173/109
(Continued)

FOREIGN PATENT DOCUMENTS

CN 101497188 A 8/2009
CN 101987351 A 3/2011
(Continued)

OTHER PUBLICATIONS

International Search Report corresponding to PCT Application No. PCT/EP2013/056986, dated May 24, 2013 (German and English language document) (7 pages).

*Primary Examiner* — Nathaniel C Chukwurah
*Assistant Examiner* — Lucas E. A. Palmer
(74) *Attorney, Agent, or Firm* — Maginot, Moore & Beck LLP (57) ABSTRACT

The disclosure relates to a hand-held power tool comprising a percussion mechanism, especially a rotary hammer and/or percussion hammer. According to the disclosure, at least one sensor unit comprising at least sensor for at least one mechanical measurement variable is provided for detecting at least one percussion parameter.

15 Claims, 7 Drawing Sheets (58) Field of Classification Search
USPC .......................................................... 173/2
See application file for complete search history.

(56) References Cited

U.S. PATENT DOCUMENTS

| | | | | |
|---|---|---|---|---|
| 5,289,885 | A * | 3/1994 | Sakoh | B25B 23/1405 173/109 |
| 6,044,918 | A * | 4/2000 | Noser | B25D 16/00 173/176 |
| 6,076,616 | A * | 6/2000 | Kramp | B25D 17/043 173/162.2 |
| 6,111,515 | A * | 8/2000 | Schaer | B25F 5/00 340/679 |
| 6,520,266 | B2 * | 2/2003 | Bongers-Ambrosius | B25D 11/12 173/115 |
| 6,598,684 | B2 * | 7/2003 | Watanabe | B25B 21/02 173/176 |
| 6,687,567 | B2 * | 2/2004 | Watanabe | B25B 23/1405 173/11 |
| 6,765,357 | B2 * | 7/2004 | Cripe | B25B 23/1405 173/176 |
| 6,766,868 | B2 * | 7/2004 | Frauhammer | B25D 16/006 173/162.2 |
| 6,836,614 | B2 * | 12/2004 | Gilmore | B23P 19/066 173/176 |
| 6,892,826 | B2 * | 5/2005 | Giardino | B25B 23/1405 173/1 |
| 6,978,846 | B2 * | 12/2005 | Kawai | B23P 19/066 173/176 |
| 6,981,557 | B2 * | 1/2006 | Boeni | B25D 11/005 173/1 |
| 6,983,807 | B2 * | 1/2006 | Mayr | B25D 16/00 173/48 |
| 7,036,703 | B2 * | 5/2006 | Grazioli | B25B 27/0085 173/176 |
| 7,055,620 | B2 * | 6/2006 | Nadig | B25D 16/003 173/176 |
| 7,398,834 | B2 * | 7/2008 | Jung | B25D 16/006 173/11 |
| 8,674,640 | B2 * | 3/2014 | Suda | B25B 21/00 173/176 |
| 8,678,106 | B2 * | 3/2014 | Matsunaga | B25B 21/008 173/176 |
| 9,180,585 | B2 * | 11/2015 | Jung | B25D 16/006 |
| 2001/0025421 | A1 * | 10/2001 | Damstra | B25F 5/00 30/43.6 |
| 2002/0003045 | A1 * | 1/2002 | Bongers-Ambrosius | B25D 16/00 173/201 |
| 2002/0029115 | A1 * | 3/2002 | Moriuchi | B23Q 11/00 702/34 |
| 2002/0050364 | A1 * | 5/2002 | Suzuki | B25B 21/02 173/1 |
| 2003/0205393 | A1 * | 11/2003 | Hoop | B25D 17/06 173/2 |
| 2004/0200628 | A1 * | 10/2004 | Schmitzer | B25D 16/00 173/1 |
| 2005/0023017 | A1 * | 2/2005 | Sakai | B25D 11/125 173/201 |
| 2005/0230130 | A1 * | 10/2005 | Strasser | B25F 5/00 173/2 |
| 2006/0254785 | A1 | 11/2006 | Watanabe | |
| 2009/0195204 | A1 * | 8/2009 | Gumpert | B25D 11/00 318/460 |
| 2011/0315414 | A1 * | 12/2011 | Kuntner | B25B 23/14 173/1 |
| 2013/0025892 | A1 * | 1/2013 | Mashiko | B25B 21/02 173/2 |
| 2015/0202758 | A1 * | 7/2015 | Nitsche | B25D 16/006 173/1 |
| 2016/0279776 | A1 * | 9/2016 | Wirnitzer | B25F 5/00 |

FOREIGN PATENT DOCUMENTS

| | | |
|---|---|---|
| DE | 10 2009 045 758 A1 | 4/2011 |
| EP | 1 502 710 A2 | 2/2005 |
| EP | 1 607 186 A1 | 12/2005 |
| EP | 2 085 755 A1 | 8/2009 |

* cited by examiner

HAND-HELD POWER TOOL

This application is a 35 U.S.C. § 371 National Stage Application of PCT/EP2013/056986, filed on Apr. 3, 2013, which claims the benefit of priority to Serial No. DE 10 2012 208 855.5, filed on May 25, 2012 in Germany, the disclosures of which are incorporated herein by reference in their entirety.

BACKGROUND

There are already known hand-held power tools that have a percussion mechanism, in particular rotary and/or percussion hammers.

SUMMARY

The disclosure is based on a hand-held power tool having a percussion mechanism, in particular a rotary and/or percussion hammer.

At least one sensor unit is proposed, having at least one sensor for at least one mechanical measured quantity, which is provided to detect at least one percussion characteristic quantity. A "hand-held power tool" is to be understood to mean, in particular, a machine for performing work on a workpiece, such as, in particular, a power drill, a rotary hammer, a chipping hammer, a tacker, a sanding appliance, an angle grinder, a saw, such as an orbital-action saw or jigsaw, a planer, a screwdriver, a router and/or a multifunction tool. Preferably, the hand-held power tool is realized as an electrically operated hand-held power tool. Also conceivable, however are hand-held power tools that are driven in a different manner, in particular pneumatically driven hand-held power tools such as, in particular, pneumatic rotary and/or percussion hammers. Likewise, persons skilled in the art may consider it appropriate to use the sensor unit according to the disclosure in the case of a stationary power tool. A "rotary and/or percussion hammer" in this context is to be understood to mean, in particular, a hand-held power tool provided with a rotary or non-rotary tool for performing work on a workpiece, wherein percussive impulses can be applied to the tool by the hand-held power tool. A "percussion mechanism" in this context is to be understood to mean, in particular, a device having at least one component provided to generate and/or transmit a percussive impulse, in particular an axial percussive impulse, to a tool disposed in a tool holder. Such a component may be, in particular, a striker, a striking pin, a guide element such as, in particular, a hammer tube, and/or a piston such as, in particular, a pot piston and/or other component considered appropriate by persons skilled in the art. The striker may transmit the percussive impulse directly or, preferably, indirectly to the tool. Preferably, the striker may transmit the percussive impulse to a striking pin, which transmits the percussive impulse to the tool. "Provided" is to be understood to mean, in particular, specially designed and/or specially equipped. A "sensor unit" in this context is to be understood to mean, in particular, a device provided to pick up and process a measured quantity. The sensor unit may comprise, in particular, a sensor and a signal processing unit. Preferably, the sensor unit may be, wholly or partially, a constituent part of a control unit of the hand-held power tool. A "control unit" in this context is to be understood to mean, in particular, a device of the hand-held power tool that is provided to control, in particular, a motor or a drive unit of the hand-held power tool by open-loop and/or closed-loop control. The control unit may preferably be realized as an electrical, in particular as an electronic, control unit. A "sensor" in this context is to be understood to mean, in particular, a component provided to sense qualitatively or quantitatively, in particular, physical properties of its environment, in at least one measured quantity. A "mechanical" measured quantity in this context is to be understood to mean a measured quantity that represents a movement and/or a force, such as, in particular, a force, an acceleration, a speed, a pressure, a sound pressure and/or structure-borne sound or a deformation and/or, in particular, a measured quantity that differs from a purely electrical quantity. A "percussion characteristic quantity" in this context is to be understood to mean, in particular, a characteristic quantity that characterizes an operation of the percussion mechanism, such as, in particular, a percussion intensity and/or a percussion frequency of a percussive operation. In particular, the percussion characteristic quantity may characterize the percussive operation of the percussion mechanism. A "percussive operation" in this context is to be understood to mean, in particular, an operating state of the percussion mechanism in which preferably regular percussive impulses are exerted by the percussion mechanism. Preferably, the percussion mechanism may have a percussion mode, in which the percussion mechanism is provided for a percussive operation. "Regular" in this context is to be understood to mean, in particular, recurring, in particular with a provided frequency. Preferably, the percussion characteristic quantity may be suitable for detecting the percussive operation. Advantageously, the percussive operation of the percussion mechanism may be identified. In particular, in the case of the percussion mechanism being changed from an idling mode to the percussion mode, the commencement of the percussive operation may be identified. If the percussive operation is absent in the percussion mode, appropriate measures may be taken to produce the percussive operation, such as changing a drive rotational speed and/or altering further percussion mechanism parameters, such as a throttle position of a ventilation and/or venting of the percussion mechanism. A sudden absence of the percussive operation in the percussion mode may be identified. In addition to the percussive operation, further percussion characteristic quantities may be identified, in particular a B-stroke. A "B-stroke" in this context is to be understood to mean, in particular, a percussive impulse caused by a rebound of the striker. Functional defects of the hand-held power tool and/or of the percussion mechanism may be identified. The percussion mechanism may be allowed to be operated in an above-critical performance range. An "above-critical" performance range in this context is to be understood to mean, in particular, an operating state in which a commencement of the percussive operation occurs in fewer than 90% of cases in the case of a change from the idling to the percussion mode. The performance capability of the percussion mechanism may be increased in an above-critical operating mode. In the case of interruptions and/or absence of the percussive operation, the percussion mechanism may be operated for a short time in a non-critical performance range, in particular by reduction of the drive rotational speed. The hand-held power tool may have a higher performance capability. Operational reliability may be improved. The hand-held power tool may be more compact and/or lighter and/or less expensive and/or energy-saving. The percussion characteristic quantity may be represented in a particularly reliable manner by a mechanical measured quantity. The measured quantity may be particularly dynamic. The percussion characteristic quantity may be detected in a particularly reliable manner.

Further, it is proposed that the sensor unit have at least one filter unit, which is provided to isolate a signal component out of a sensor signal. A "sensor signal" in this context is to be understood to mean, in particular, a signal that is output, as a representation of the measured mechanical measured quantity, by the sensor of the sensor unit. A "filter unit" in this context is to be understood to mean, in particular, a unit provided to alter the sensor signal in its signal spectrum. The filter unit may be part of a signal processing unit. The filter unit may be, at least partially, a physical unit constituted by components. Preferably, the filter unit may be constituted, at least partially, by a processing algorithm that is processed by a computing unit of the sensor unit for the purpose of filtering the sensor signal. In particular, the filter unit may be provided to amplify and/or attenuate frequency bands, and/or to attenuate unwanted signal components and/or amplify wanted signal components. "Wanted" signal components in this context are to be understood to mean, in particular, components of the sensor signal that are suitable for detecting the percussion characteristic quantity, such as, in particular, signal components caused at least substantially directly or indirectly by the percussive impulse. In particular, a "wanted signal component" is to be understood to mean a frequency and/or a frequency spectrum that is excited, at least substantially, by the percussive impulse. "Unwanted" signal components in this context are to be understood to mean, in particular, signal components that are at least only to a limited extent suitable for detecting the percussion characteristic quantity, such as signal components caused, at least substantially, by vibrations of the motor or of a transmission of the hand-held power tool or by operations of performing work on the workpiece. "At least substantially" is to be understood to mean, in particular, "predominantly", i.e. by more than 50%, preferably by more than 75%, particularly preferably by more than 90%. The sensor unit may detect the percussion characteristic quantity in a particularly reliable manner. Disturbances of the sensor signal may be reduced.

It is proposed that the sensor unit be provided to use an expected percussion frequency and/or an expected percussion instant as a parameter. An "expected percussion frequency" in this context is to be understood to mean, in particular, a frequency with which the percussion mechanism exerts percussive impulses in percussive operation in the case of known operating parameters, in particular in the case of a known drive rotational speed. An "expected percussion instant" in this context is to be understood to mean, in particular, an instant and/or a time window in which the percussion mechanism exerts a percussive impulse in the case of known operating parameters. In particular, a percussion frequency of the percussion mechanism in percussive operation may be dependent on a rotational speed and/or a rotary position of the drive unit of the percussion mechanism. In the case of a known rotational speed, the frequency and/or the frequency band with which the percussion mechanism in percussive operation exerts percussive impulses is known. A percussive impulse may be effected in the case of a known rotary position of the drive unit. The percussive impulse may be effected when a piston, driven by an eccentric gear mechanism of the drive unit, is in the region of a front end position in the percussion direction. In order to sense the rotational speed and/or the rotary position of the eccentric gear mechanism, in the case of a known transmission ratio in relation to the eccentric gear mechanism, a rotational speed and/or a rotary position of the motor of the drive unit may also be evaluated, and the rotational speed and/or the rotary position of the eccentric gear mechanism may be determined therefrom. The control unit may communicate the rotational speed and/or rotary position and/or the expected percussion frequency to the sensor unit. Persons skilled in the art will know further appropriate means of determining an expected percussion frequency and/or an expected percussion instant. The sensor unit may evaluate the sensor signal in a particularly reliable manner. Unwanted signal components may be removed particularly effectively. Wanted signal components may be amplified and/or detected particularly effectively. In particular, the sensor unit may suppress frequency ranges outside of the expected frequency band. In particular, the sensor unit may limit detection of the percussion characteristic quantity to time windows in which the percussion characteristic quantity is to be expected. The sensor unit may adapt the evaluation of the sensor signal particularly effectively to the operating parameters of the hand-held power tool. In particular, the sensor unit may adapt the evaluation of the sensor signal to the rotational speed and/or percussion frequency with which the percussion mechanism is operated. Preferably, at least one frequency may be dependent on the expected percussion frequency and/or on the expected percussion instant. Preferably, a filter frequency and/or a filter frequency band may be defined such that the expected percussion frequency and/or a frequency excited by the expected percussion frequency and/or a frequency band excited by the expected percussion frequency may be isolated particularly effectively out of the sensor signal. Preferably, at least one time window for sensing and/or evaluating the sensor signal may be dependent on the expected percussion frequency and/or on the expected percussion instant. The sensor unit may be particularly efficient and reliable. The percussion characteristic quantity may be detected in a particularly reliable manner. Influences of spurious signals may be reduced. It is possible to avoid the evaluation of sensor signals at instants at which an occurrence of percussive impulses is at least improbable.

It is proposed that the filter unit have an analog filter. An "analog filter" in this context is to be understood to mean, in particular, a time-continuous and amplitude-continuous filter. In particular, the analog filter may comprise electrical components such as inductors, capacitors, amplifiers and other commonly used components considered by persons skilled in the art to be suitable for the filtering of signals. The analog filter may operate in a frequency domain or, preferably, in a time domain. A "time domain" in this context is to be understood to mean, in particular, that a time-dependent representation of the sensor signal is present as an input signal of the filter. A "frequency domain" in this context is to be understood to mean, in particular, that a frequency spectrum of the sensor signal during a time window is present as an input signal of the filter. A "time window" in this context is to be understood to mean, in particular, a time interval. Preferably, the analog filter may comprise a bandpass filter. A "bandpass filter" in this context is to be understood to mean, in particular, a filter that suppresses frequencies outside of a wanted frequency band. Preferably, the frequency band of the bandpass filter may be settable, in particular in dependence on the expected percussion frequency and/or frequencies and/or frequency bands excited by the expected percussion frequency. The analog filter may comprise a rectifier. The analog filter may integrate the, in particular, rectified sensor signal, for example by means of a capacitor. Preferably, the analog filter may integrate the sensor signal during the duration of a time window. Preferably, the time window may be a time window in which a percussive impulse is expected. A time interval of the time window may be, in particular, a fraction of an expected duration of a percussion cycle. Preferably, the duration may be ⅓-⅕, particularly preferably ¼, of the expected duration of a percussion cycle. In this case, a percussive impulse may occur on average in each third to fifth time window. From the rotary position of the eccentric gear mechanism and/or of the drive unit, it may be known whether a percussive impulse can occur in a time window. Preferably, the analog filter may be provided to evaluate only the time windows in which percussive impulses can occur. The analog filter may comprise a comparator, which may be provided, in particular, to compare the sensor signal, integrated during a duration of the time window, with a comparison signal. A "comparison signal" in this context is to be understood to mean, in particular, a signal level selected so as to be higher than a signal level typically attained in the case of an idling operation of the percussion mechanism, and selected so as to be lower than a signal level typically attained in the case of the percussive operation of the percussion mechanism. The analog filter may output a digital signal upon identifying the percussion characteristic quantity, in particular a percussive impulse. In particular, the analog filter may output the digital signal if the integrated sensor signal exceeds a comparison signal. The comparison signal may preferably be dependent on operating parameters of the hand-held power tool and/or settable. The percussion characteristic quantity may be detected in a simple and reliable manner. The sensor unit may signal the occurrence of the percussion characteristic quantity to the control unit by means of a simple digital signal. The analog filter may have a particularly low latency. The analog filter may be particularly reliable. The analog filter may be particularly energy-saving. The analog filter may process particularly high frequencies. Quantization errors may be avoided. Preferably, the filter unit may be integrated with the sensor in a sensor module. The sensor module may filter the sensor signal, integrate it during a time interval, and output an integral of the sensor signal that may be compared directly with the comparison signal for the purpose of detecting the percussion characteristic quantity. A particularly simple and inexpensive structure is rendered possible.

In a further design of the disclosure, it is proposed that the filter unit have a digital filter. A "digital filter" in this context is to be understood to mean, in particular, a filter that is realized, at least partially, in a time-discrete manner, by means of a processing algorithm on a computing unit, in particular on a signal processor. The digital filter may operate in the time domain or, preferably, in the frequency domain. Preferably, the digital filter includes an analog/digital converter, which is provided to digitize the sensor signal. The analog/digital converter may sample the sensor signal with a sampling frequency and convert it to a time-discrete digital signal. The sampling frequency is appropriately selected by persons skilled in the art, preferably so as to be at least twice as great as the maximum frequencies of the sensor signal that are to be isolated out of the sensor signal by the digital filter. The sensor signal may be present as a digitally coded frequency spectrum during a time window having a defined time interval. The frequency spectrum includes the sensed frequencies of the sensor signal during the time interval. The time interval may preferably be matched to the expected percussion frequency. The time interval of the time window may be, in particular, a fraction of the expected duration of a percussion cycle. Preferably, the duration may be ⅓-⅕, preferably ¼, of the expected duration of a percussion cycle. The digital filter may include a bandpass filter. The bandpass filter may be provided to suppress frequencies outside of a frequency band around the expected percussion frequency. The digital filter may comprise a summation element. The summation element may be provided to form a sum of signal levels in a frequency band around the expected percussion frequency, during each time window. A width of the frequency band, outside of which the sensor signal is suppressed, or within which the sensor signal is summed by the summation element, may be settable. The width may be selected, by persons skilled in the art, so as to be sufficiently wide for a high probability of sensing of percussive impulses. The width may be selected, by persons skilled in the art, so as to be sufficiently narrow for a high probability of suppression of spurious signals. A comparator may compare the sum with a comparison signal. If the sum exceeds the comparison signal, the digital filter may output, for example by means of a digital signal, that a percussive impulse is identified. The digital filter may have particularly small tolerances. Manual adjustment/setting of the filter may be avoided. Particularly powerful filter functions may be realized. The digital filter may be implemented on an existing signal processor of the control unit. Savings may be made in respect of components and costs.

Further, it is proposed that the filter unit be provided to process the sensor signal by means of a Fourier transformation. In particular, the filter unit may be provided to process the sensor signal by means of a 1-point Fourier transformation, in the case of a known frequency. The frequency may be, in particular, the expected percussion frequency. A "Fourier transformation" in this context is to be understood to mean, in particular, a method, known to persons skilled in the art, that is provided to convert a signal in the time domain into a frequency spectrum. A percussive impulse may be identified when the Fourier transformation, in the case of the known frequency, produces a value that exceeds the comparison signal. A particularly simple digital filter may be achieved, for detecting the percussion characteristic quantity. For the purpose of detecting the percussion characteristic quantity, it may suffice to convert only a frequency band from the time domain into the frequency domain. The sensor unit may be particularly inexpensive and/or reliable.

Further, it is proposed that at least one sensor of the sensor unit, realized as an acceleration sensor and/or structure-borne sound sensor, be provided to measure an acceleration and/or a mechanical vibration. In particular, the sensor may be provided to measure an acceleration and/or structure-borne sound at a component of the hand-held power tool. "Structure-borne sound" in this context is to be understood to mean, in particular, a mechanical vibration that propagates in a body, in particular in a component of the hand-held power tool. Preferably, the sensor may be disposed at a component of the hand-held power tool at which the percussive impulses cause particularly large accelerations and/or particularly intense structure-borne sound. "Disposed" in this context is to be understood to mean, in particular, connected directly or indirectly in a force-fitting and/or form-fitting manner. Preferably, the sensor may be disposed in a side of the hand-held power tool that faces toward the tool holder. Preferably, the sensor is realized as a one-dimensional acceleration sensor. A "one-dimensional acceleration sensor" in this context is to be understood to mean, in particular, a sensor provided to sense accelerations in one direction. An acceleration may represent the percussive impulse in a particularly reliable manner. The sensor may be particularly suited to sensing percussive impulses. Accelerations in other directions, in particular from sources other than the percussive impulse, may have particularly little influence upon the measured quantity of the sensor. Particularly preferably, the sensor is realized as a structure-borne sound sensor, in particular as a knock sensor. A "knock sensor" in this context is to be understood to mean, in particular, a structure-borne sound sensor provided to detect defined signal components. Knock sensors are known to persons skilled in the art, in particular for the detection of knock signals in the case of internal combustion engines. Preferably, the sensor comprises a filter unit, particularly preferably a digital filter. Particularly preferably, the sensor is realized as a piezoelectric sensor. Preferably, the sensor may be realized, with the filter unit, as a module. A "module" in this context is to be understood to mean, in particular, a component. The module may be provided, in particular, to be connected in one piece to a component of the hand-held power tool, in an assembly operation. The sensor may output the isolated sensor signal directly. There is no need for a further filter unit. The sensor unit may be particularly inexpensive.

In a further design of the disclosure, it is proposed that at least one sensor of the sensor unit, realized as a force sensor, be provided to measure a force. In particular, the sensor may be fitted directly in a flux of force, and measure a force exerted upon a sensor body. The sensor may be a piezoelectric sensor. A piezoelectric sensor may measure a force in a particularly reliable manner. The sensor may measure a deformation of a component of the hand-held power tool that is subjected to a force. In particular, the sensor may be a strain sensor. A resistance bridge may be provided to condition the sensor signal of the strain sensor and/or make it available to the filter unit. The force sensor may be disposed, in particular, on a component and/or in the flux of force in which the percussive impulse of the percussion mechanism generates a particularly large force. For example, the force sensor may be disposed on the tool and/or in the flux of force of the tool. The percussion characteristic quantity may be identified particularly effectively. Vibrations and other disturbing quantities in a direction other than the percussion direction may have a particularly small influence on the sensor signal. Forces that are outside of the flux of force of the sensor and/or outside of the flux of force of the component at which the sensor is disposed may have a particularly small influence.

Further, it is proposed that the sensor unit have at least one sensor carrier having at least one natural frequency matched to the percussion characteristic quantity to be detected. A "sensor carrier" in this context is to be understood to mean, in particular, a bearing device provided to support a sensor. The sensor is preferably directly or indirectly connected to the sensor carrier in a form-fitting and/or force-fitting manner. The sensor is preferably directly or indirectly connected to a component of the hand-held power tool in a form-fitting and/or force-fitting manner. Particularly preferably, the sensor carrier is realized so as to be integral with a component of the hand-held power tool. In particular, the sensor carrier may be constituted by the transmission housing and/or a part of the transmission housing. A "natural frequency matched to the percussion characteristic quantity to be detected" in this context is to be understood to mean, in particular, a natural frequency that corresponds to the frequency of a vibration of the percussion characteristic quantity and/or a frequency of a vibration excited by the percussion characteristic quantity. Preferably, the sensor carrier has at least one natural frequency in the range of the expected percussion frequency and/or of a vibration excited by the expected percussion frequency. Preferably, the sensor carrier may have a plurality of natural frequencies, and/or its natural frequency or its natural frequencies may be variable. The sensor carrier may advantageously be matched to differing percussion characteristic quantities and/or frequencies of vibrations excited by the percussion characteristic quantities. The sensor carrier may amplify the mechanical measured quantity by a natural vibration. The sensor may sense the percussion characteristic quantity particularly effectively. Detection of a percussion characteristic quantity may be particularly reliable. Further, it is proposed that the sensor carrier be provided to effect filtering of the mechanical measured quantity to be measured by the sensor. In particular, the sensor carrier may comprise at least one elastic element, which preferably constitutes a low-pass filter for the mechanical measured quantity. Disturbing high-frequency components of the mechanical measured quantity may be reduced before they reach the sensor. In particular, the sensor carrier may at least largely suppress frequencies above the percussion frequency, preferably above 500 Hz, particularly preferably above 100 Hz. The sensor may be particularly effective in sensing accelerations generated by the percussion frequency. Preferably, the sensor may be particularly effective in sensing accelerations in a frequency band of 20-50 Hz.

Further, it is proposed that a measuring direction of at least one sensor of the sensor unit be disposed at least substantially axially in relation to the percussion direction. Preferably, the sensor is provided, in particular, to measure mechanical measured quantities in the percussion direction. In particular, the sensor may have a sensitivity maximum at least substantially in the percussion direction. "Substantially" in this context is to be understood to mean a deviation of less than 30°, preferably less than 15°, particularly preferably less than 5°. The sensor may be particularly effective in sensing a mechanical measured quantity caused by a percussive impulse.

Further, it is proposed that the sensor unit have at least one sensor provided to sense a rotary position. Preferably, the sensor is provided to sense a rotary position of an eccentric of the eccentric gear mechanism. In particular, the rotary position may define a time window in which a percussive pulse is to be expected. The control unit may check the rotary position of the eccentric, for example in dependence on a drive rotational speed and/or a percussion instant. Malfunctions may be identified.

It is proposed that the sensor unit be provided to detect the percussion characteristic quantity during a time window that is dependent on the rotary position. The sensor unit may particularly effectively determine a time window for detecting the percussion characteristic quantity. Disturbing quantities outside of the time window may be eliminated. An evaluation of the sensor signal in time windows in which no percussive impulse is to be expected may be avoided. Computing power may be saved. Effort for evaluating the sensor signal may be reduced.

Further, it is proposed that at least one sensor of the sensor unit be disposed on a hammer tube. The striker is moved in the hammer tube. The tool holder may be connected to the hammer tube. Percussive impulses of the striker can be measured particularly effectively on the hammer tube. The measured quantity may be measured particularly close to the site of origin. An acceleration sensor and/or a structure-borne sound sensor and/or, preferably, a force sensor may be disposed on the hammer tube. In particular, a strain sensor may be disposed on the hammer tube. "Disposed" in this context is to be understood to mean, in particular, connected directly or indirectly in a force-fitting and/or form-fitting manner. The percussive impulses may be particularly effective in generating measurable mechanical measured quantities for the sensor.

Further, it is proposed that at least one sensor of the sensor unit be disposed on a striking pin. In particular, a force sensor, in particular a piezoelectric sensor, may be disposed in the flux of force of a striking pin. Preferably, the sensor signal may be transmitted wirelessly. The percussive impulses may be measured particularly directly. Detection of the percussion characteristic quantity may be particularly reliable. A wireless transmission may be particularly reliable. It is possible to avoid the need for additional openings in the hammer tube, for signal connections.

Further, it is proposed that at least one sensor be disposed on a transmission housing. Preferably, an acceleration sensor, particularly preferably a structure-borne sound sensor, may be disposed on the transmission housing. The sensor arrangement may be particularly simple. Electrical signal connections to the sensor may be particularly simple. The electrical safety of the hand-held power tool may be improved. It is possible to avoid the need for signal connections in the region of the hammer tube and/or of the tool receiver. Particularly preferably, a sensor and/or the sensor unit may be realized so as to be integral with the control unit. Preferably, the control unit may be mechanically connected to the transmission housing, in particular carried on the transmission housing. The arrangement of the sensor and/or of the sensor unit may be particularly simple. An assembly operation may be simplified. Costs may be reduced.

Further, it is proposed that at least one sensor of the sensor unit have a wireless signal connection. A "wireless" signal connection in this context is to be understood to mean, in particular, a connection by means of electrical and/or electromagnetic waves, such as radio waves and/or light waves. In particular, a signal connection may be effected by means of air-core coils. A signal transmission from the sensor to a signal processing unit may be particularly reliable. The need for openings in components for signal lines may be avoided. The need for moving signal lines may be avoided. Cable breakages of signal lines may be prevented.

Further, it is proposed that the sensor unit have a plurality of the said sensors. A percussion characteristic quantity may be identified in a particularly reliable manner. A plausibility check, taking account of a plurality of sensor signals, is possible.

Further, there is proposed a sensor unit of a hand-held power tool, having the properties mentioned. The sensor unit may have the advantages mentioned. The sensor unit may be provided to identify and signal the signal operation. The sensor unit may be retrofitted in the case of existing hand-held power tools. The hand-held power tools may have the advantageous mentioned.

Further, there is proposed a method for detecting a percussion characteristic quantity, having the steps described. In particular, the method comprises a signal processing of a sensor signal for the purpose of identifying a percussion characteristic quantity. The method may take account, in particular, of an expected frequency and an expected time window of the percussion characteristic quantity. The method may be used on a multiplicity of machines, in order to identify an operation in which percussive impulses occur.

BRIEF DESCRIPTION OF THE DRAWINGS

Further advantages are given by the following description of the drawing. The drawing shows seven exemplary embodiments of the disclosure. The drawing, the description and the claims contain numerous features in combination. Persons skilled in the art will also expediently consider the features individually and combine them to create appropriate further combinations.

In the drawing.

DETAILED DESCRIPTION

Figure 1:
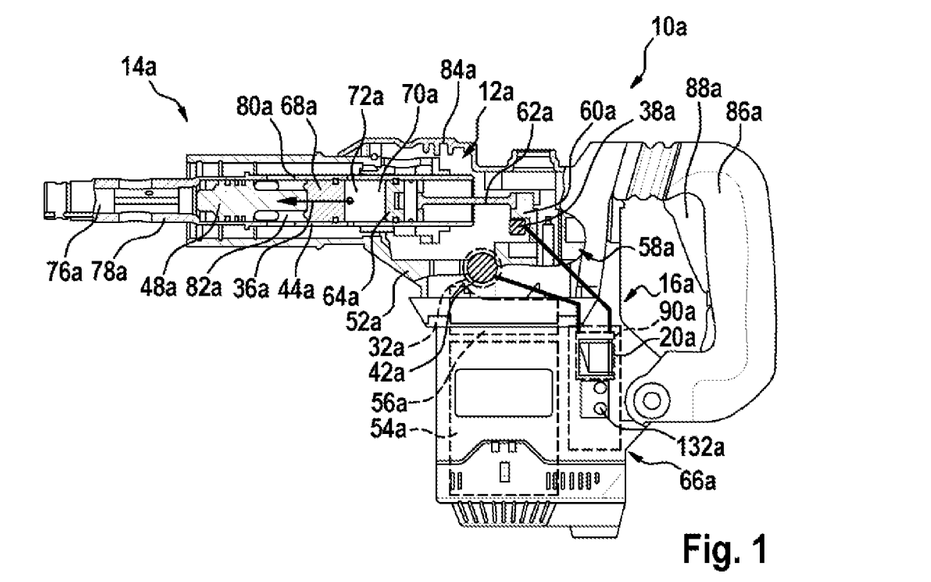
FIG. 1 shows a schematic representation of a hand-held power tool, comprising a percussion mechanism, which has a sensor unit that comprises a sensor and that comprises a further sensor for sensing a rotary position.

FIG. 1 shows a hand-held power tool 10a comprising a percussion mechanism 12a, which is realized as a percussion hammer 14a, having a sensor unit 16a that comprises a sensor 42a for a mechanical measured quantity, wherein the sensor unit 16a is provided to detect a percussion characteristic quantity. The hand-held power tool 10a includes a motor 54a, comprising a transmission unit 56a that drives an eccentric gear mechanism 58a during operation of the percussion mechanism 12a. The eccentric gear mechanism 58a includes an eccentric 60a by which, via a connecting rod 62a, a piston 64a that is guided in a hammer tube 44a is moved translationally back and forth in a percussion direction 36a. A striker 68a, which is guided in the hammer tube 44a, is disposed in front of the piston 64a in the percussion direction 36a. An air cushion 72a is enclosed in a space 70a that is closed off by the hammer tube 44a, the striker 68a and the piston 64a. A striking pin 48a, which is carried in the hammer tube 44a, is disposed in front of the striker 68a in the percussion direction 36a. The striking pin 48a is in contact with a tool 76a in a tool receiver 78a. Venting openings 80a are disposed in the hammer tube 44a, in a region between the striker 68a and the striking pin 48a. The venting openings 80a enable pressure equalization to be effected between a space 82a, delimited by the striking pin 48a and by the striker 68a with the hammer tube 44a, and an environment of the hand-held power tool 10a. If the piston 64a is moved in the percussion direction 36a, the air cushion 72a is compressed and the striker 68a is accelerated in the direction of the striking pin 48a. When the striker 68a impacts upon the striking pin 48a, it exerts a percussive impulse that is transmitted from the striking pin 48a to the tool 76a. As a result of the rebound of the striker 68a from the striking pin 48a and/or a negative pressure in the air cushion 72a, as against a pressure in the space 82a, the striker 68a, upon a subsequent return of the piston 64a against the percussion direction 36a, is moved away from the striking pin 48a, in the hammer tube 44a. The piston 64a then moves back in the percussion direction 36a and compresses the air cushion 72a, such that a new percussion cycle commences. The percussion mechanism 12a, comprising the hammer tube 44a, with the piston 64a, the striker 68a, the striking pin 48a and the eccentric gear mechanism 58a, and the transmission unit 56a are mounted in a transmission housing 52a. The motor 54a is disposed on the transmission housing 52a. The transmission housing 52a and the motor 54a are partially encompassed by a hand-held power tool housing 84a. A main handle 86a is used by a user to guide the hand-held power tool 10a, and includes a tool switch 88a for activating the motor 54a and a percussive operation. A control unit 66a is provided to regulate a percussion-mechanism rotational speed of the eccentric gear mechanism 58a and, consequently, a percussion frequency. The percussion frequency in percussive operation is typically in a range of 25-50 Hz. Via an operating unit 132a, the user can preselect a percussion frequency, or the percussion frequency can be selected by the control unit 66a in dependence on an operating mode. The percussion-mechanism rotational speed determines the percussion frequency with which the piston 64a is moved back and forth, and with which the striker 68a executes percussive impulses. Reliable starting of the percussion mechanism 12a is possible up to a limit value of the percussion-mechanism rotational speed. In the case of a higher percussion-mechanism rotational speed, the striker 68a can no longer follow the movement of the piston 64a. The percussive operation does not ensue, or ensues only unreliably. In this case, the striker 68a does not exert any percussive impulses, or exerts only isolated percussive impulses, upon the striking pin 48a, or there is only a low percussion intensity. The limit value up to which a percussion mechanism start is reliable and the striker 68a begins to exert percussive impulses upon the striking pin 48a with the percussion frequency is dependent, inter alia, on the ambient air pressure. This relationship is known to persons skilled in the art. If the percussion mechanism 12a has already been started, the striker 68a can still follow the movement of the piston 64a, at a higher percussion-mechanism rotational speed than in the case of the percussion mechanism start. A reliable working value of the percussion-mechanism rotational speed in percussive operation may be selected so as to be higher than the limit value for the percussion mechanism start. In this case, the working value is an above-critical working value with an above-critical percussion-mechanism rotational speed. The sensor unit 16a is provided to detect the percussive operation as a percussion characteristic quantity of the percussion mechanism 12a. A sensor signal that signals the percussive operation is transmitted to the control unit 66a by the sensor unit 16a. If the control unit 66a identifies absence of the percussive operation, it can reduce the percussion-mechanism rotational speed until the percussive operation commences. This is the case, in particular, if the working value is an above-critical working value above the limit value. The control unit 66a can store reliable start values at which starting of the percussion mechanism 12a was successful, and can use them for subsequent percussion mechanism starts. In this case, the working value is set only after the percussion mechanism start has been effected.

In order to detect the percussive operation, the sensor unit 16a includes the sensor 42a and a further sensor 38a. The sensor 42a is a structure-borne sound sensor, in the present case a knock sensor, as in the case of internal combustion engines, for identifying knocking noises during combustion (premature ignitions). The sensor 42a is disposed on the transmission housing 52a, into which a sensor carrier 32a is integrated. The sensor 42a senses mechanical vibrations on the transmission housing 52a. The vibrations are excited, in particular, by percussive impulses of the percussion mechanism 12a. The sensor 38a is realized as an inductive sensor. The sensor 38a identifies markings, not represented in greater detail, made on the eccentric 60a. The sensor 38a senses a rotary position of the eccentric 60a. In particular, the sensor 38a senses a rotary position of the eccentric 60a. In particular, the sensor 38a senses a rotary position of the eccentric 60a in which the piston 64a has reached a dead center of the piston movement, at the front in the percussion direction 36a. In the exemplary embodiment represented, in percussive operation, the striker 68a, depending on a phase position of the striker movement in relation to the piston movement, will exert a percussive impulse shortly after the piston 64a has reached the front dead center. The sensor unit 16a has a signal processing unit 90a, which is connected to the sensors 42a and 38a via signal connections. The signal processing unit 90a is disposed on the control unit 66a.

Figure 2:
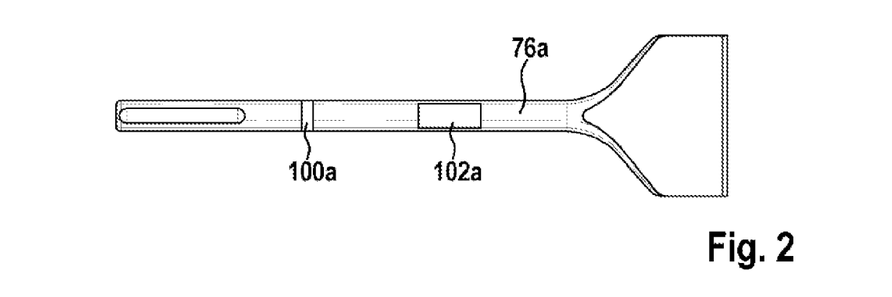
FIG. 2 shows a schematic representation of a tool having sensors.

A further sensor 102a, realized as a strain sensor, and a further sensor 100a, realized as a piezoelectric sensor, are disposed on the tool 76a (FIG. 2). These sensors 100a, 102a are particularly effective in sensing the percussive impulses directly on the tool 76a. The tool 76a and the tool receiver 78a have electrical contacts, not represented in greater detail, for transmitting signals from the tool 76a to the signal processing unit 90a. The tool 76a, with the sensors 100a and 102a, may optionally be used, in particular, for calibrating the signal processing unit 90a. In normal operation, with conventional tools, the sensors 100a and 102a are absent.

Figure 3:
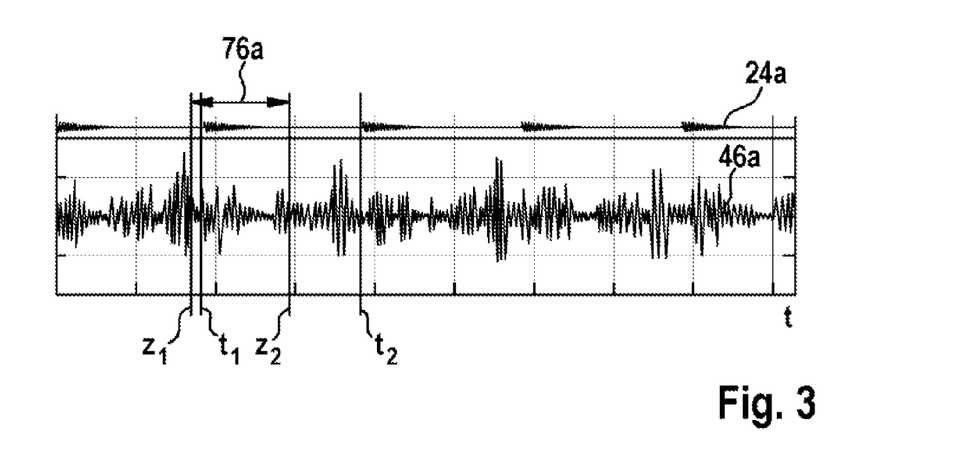
FIG. 3 shows a schematic representation of sensor signals with a time window that is dependent on a rotary position.

The sensor unit 16a is provided to detect the percussion characteristic quantity during a time window 40a that is dependent on the rotary position of the eccentric 60a. FIG. 3 shows a signal characteristic of sensor signals 24a of the sensor 100a on the tool 76a (top) and of sensor signals 46a of the sensor 42a on the transmission housing 52a (bottom). t1, t2 are percussion instants at which the striker 68a exerts a percussive impulse upon the striking pin 48a. These are clearly visible in the sensor signal 24a of the sensor 100a. Z1 to Z2 mark a time window 40a, during which a percussive impulse occurs and during which the sensor unit 16a evaluates the sensor signals 24a, 46a. The sensor unit 16a detects the percussion characteristic quantity during this time window 40a. The striker 68a exerts percussive impulses when the piston 64a is in the region of the dead center of the piston movement that is at the front in the percussion direction 36a. The movement of the piston 64a depends directly on the rotary position of the eccentric 60a. The sensor unit 16a defines the time window 40a in dependence on the rotary position of the eccentric 60a that is sensed by the sensor 38a. Upon the next revolution of the eccentric 60a, a subsequent time window, which commences shortly before the percussion instant t2, is defined in a corresponding manner. This procedure is repeated in a corresponding manner with each revolution of the eccentric 60a.

Figure 4:
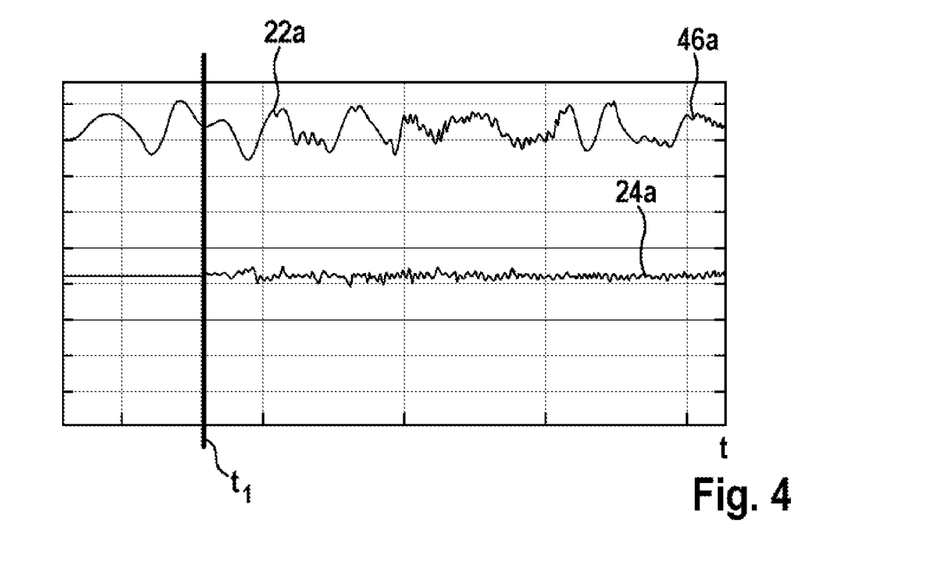
FIG. 4 shows a schematic representation of the sensor signals in a time domain in the case of a percussive operation of the hand-held power tool.

The percussion instants t1, t2 . . . cannot be identified directly from the sensor signal 46a of the sensor 42a on the transmission housing 52a, because of superposed disturbances. To evaluate these signals 46a, the sensor unit 16a includes a filter unit 20a. The filter unit 20a is part of the signal processing unit 90a. FIG. 4 shows an enlarged portion of the sensor signals 46a (top) and 24a (bottom). The percussion instant t1 is clearly visible in the sensor signal 24a. The sensor signal 46a has superposed disturbances, in particular low-frequency vibrations that are produced, inter alia, by the transmission unit 56a and the eccentric 60a. From the percussion instant t1 onwards, there are slowly decaying, high-frequency signal components 22a superposed on the sensor signal 46a. These signal components 22a are excited, in particular, by the percussive impulses. The signal components 22a typically have frequencies in a frequency band of 1-7 kHz. The transmission housing 52a constituting the sensor carrier 32a has natural frequencies in this range. The natural frequencies are matched to the percussion characteristic quantity to be detected. Vibrations that generate the signal components 22a, amplified by the natural frequencies, are transmitted to the sensor 42a, and can be isolated in an effective manner.

Figure 5:
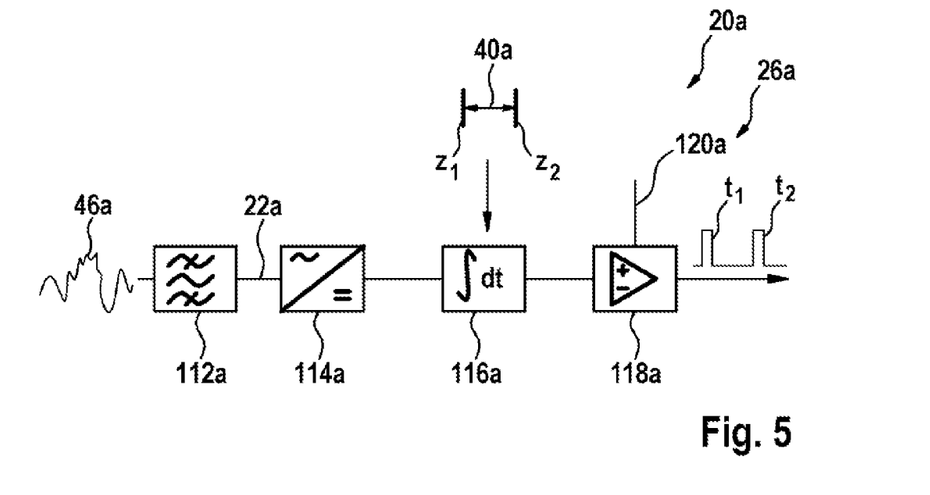
FIG. 5 shows a block diagram of an analog filter in the time domain.

The sensor unit 16a has a filter unit 20a, which is provided to isolate the signal component 22a out of the sensor signal 46a. The filter unit 20a is further provided to detect percussion instants t1, t2, . . . . The filter unit 20a is realized as an analog filter 26a (FIG. 5). The sensor signal 46a is filtered in a time domain, i.e. as a time-dependent sensor signal 46a, by a bandpass filter 112a. The bandpass filter 112a suppresses frequencies outside of a frequency band that is excited, in particular, by the percussive impulse. Disturbances caused by the transmission unit 56a and components of the sensor signal 46a that are excited by further influences can be suppressed. The signal component 22a that contains the high-frequency vibrations excited by the percussive impulses is filtered out of the sensor signal 46a by the bandpass filter 112a. In a further step, the signal component 22a is rectified by a rectifier 114a, and integrated by an integrator 116a during the time window 40a. The time window 40a is synchronized with the rotary position of the eccentric 60a, by means of the sensor 38a. The filter unit 20a of the sensor unit 16a is provided to use an expected percussion frequency and an expected percussion instant as parameters. The percussion frequency and the percussion instant are determined by means of the sensor 38. A time interval of the time window 40a is a fraction of a duration of a percussion cycle, in the example ⅓-¼ of the duration of the percussion cycle. A comparator 118a then compares the integral of the filtered sensor signal 46a with a comparison signal 120a. If the integral of the filtered sensor signal 46a exceeds the comparison signal 120a, the filter unit 20a detects a percussive impulse and outputs the percussion instants t1, t2, . . . . In the case of regularly occurring percussion instants t1, t2, . . . , the sensor unit 16a signals the percussive operation to the control unit 66a. In addition, the sensor unit 16a can determine the percussion frequency and transmit it to the control unit 66a.

The following descriptions and the drawings of further exemplary embodiments are limited substantially to the differences between the exemplary embodiments and, in principle, reference may also be made to the drawings and/or the description of the other exemplary embodiments in respect of components having the same designation, in particular in respect of components having the same reference numerals. To differentiate the exemplary embodiments, the letters b, c, d, e, f and g have been appended to the references of the further exemplary embodiments, instead of the letter a of the first exemplary embodiment.

Figure 6:
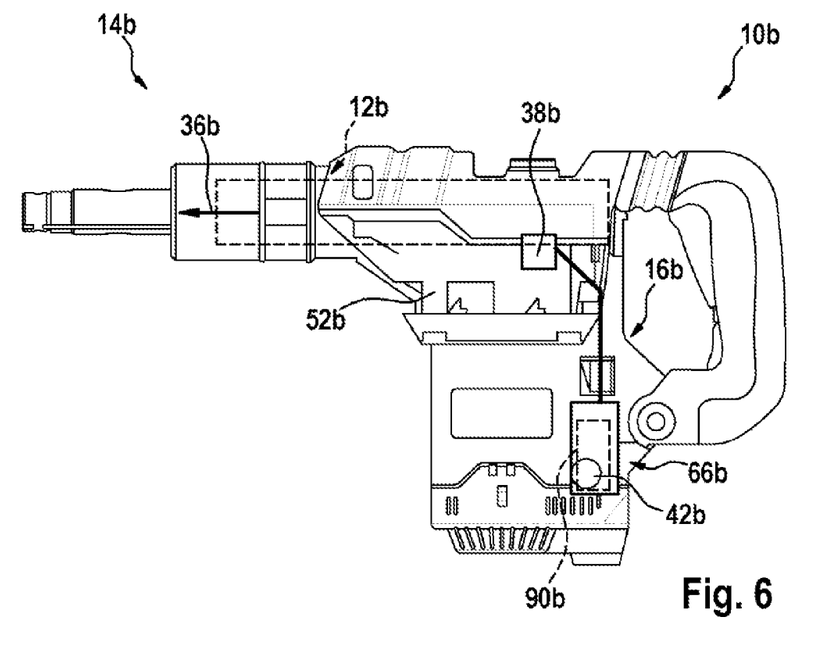
FIG. 6 shows a schematic representation of a hand-held power tool, comprising a percussion mechanism, which has a sensor unit that comprises a sensor and that comprises a further sensor for sensing a rotary position, in a second exemplary embodiment.

FIG. 6 shows a hand-held power tool 10b comprising a percussion mechanism 12b, which is realized as a percussion hammer 14b, having a sensor unit 16b that comprises a sensor 42b for a mechanical measured quantity, which sensor unit is provided to detect a percussion characteristic quantity, in a second exemplary embodiment. The hand-held power tool 10b differs from the preceding example, in particular, in that the sensor 42b is disposed directly on a signal processing unit 90b. The signal processing unit 90b is part of a control unit 66b of the hand-held power tool 10b. The control unit 66b, with the signal processing unit 90b and the sensor 42b, is mechanically connected to a transmission housing 52b of the hand-held power tool 10b. Accelerations acting upon the transmission housing 52b are transmitted to the sensor 42b. The sensor 42b is realized as an acceleration sensor. A further sensor 38b is realized as an optical sensor, and identifies a rotary position of an eccentric, not represented in greater detail here. The sensor 38b serves, in particular, to detect a dead center of a movement of a piston, likewise not represented in greater detail here, which dead center is at the front in a percussion direction 36b.

Figure 7:
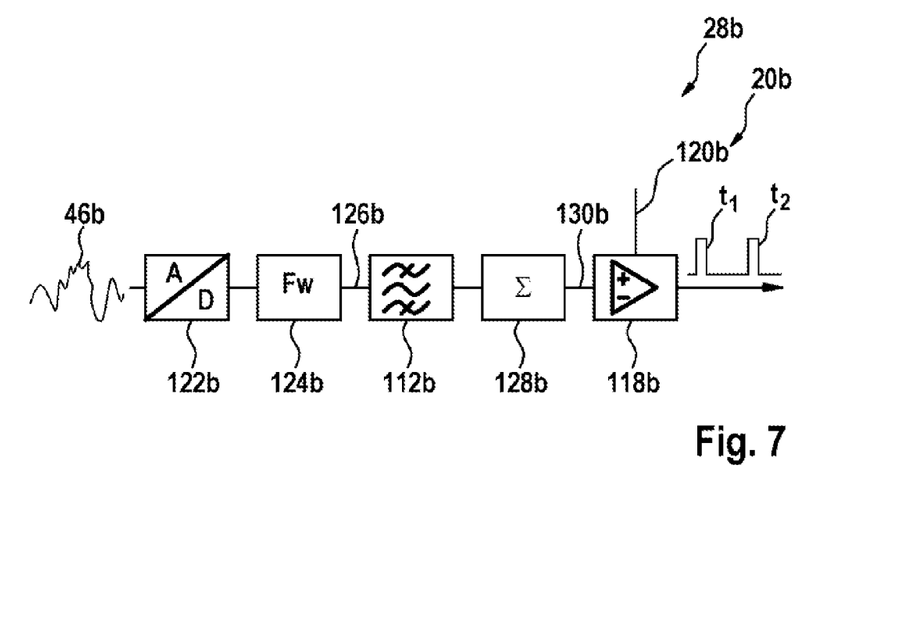
FIG. 7 shows a block diagram of a digital filter, in a frequency domain, of the hand-held power tool of the second exemplary embodiment.

FIG. 7 shows a filter unit 20b, which differs from the filter unit 20a of the hand-held power tool 10a of the first exemplary embodiment in that the filter unit 20b has a digital filter 28b. The filter unit 20b processes a sensor signal 46b in a frequency domain 126b. A frequency spectrum is in each case determined during successive time windows 40b. A duration of each time window 40b is fixed at ¼ of the expected percussion frequency. The expected percussion frequency is determined by means of the sensor 38b. In the present example, the sensor signal 46b is evaluated in each time window 40b, i.e. also in time windows 40b in which no percussive impulse is to be expected. The sensor signal 46b is digitized, in a first step, by an analog/digital converter 122b. The digitized sensor signal 46b is converted to the frequency domain 124b, and is present as a frequency spectrum 126b. A bandpass filer 112b suppresses frequencies outside of the frequency band that is excited, in particular, by percussive impulses. A summation element 128b sums up the thus filtered sensor signal 46b, and produces a sum 130b. During the time window 40b, a comparator 118b then compares the sum 130b of the filtered sensor signal 46b with a comparison signal 120b. If the sum 130b exceeds the comparison signal 120b, the filter unit 20b detects a percussive impulse and outputs the percussion instants t1, t2, . . . (FIG. 7). In the case of regularly occurring percussion instants t1, t2, . . . , the sensor unit 16b signals the percussive operation to a control unit 66b. In addition, the sensor unit 16b can determine the percussion frequency and transmit it to the control unit 66b.

Figure 8:
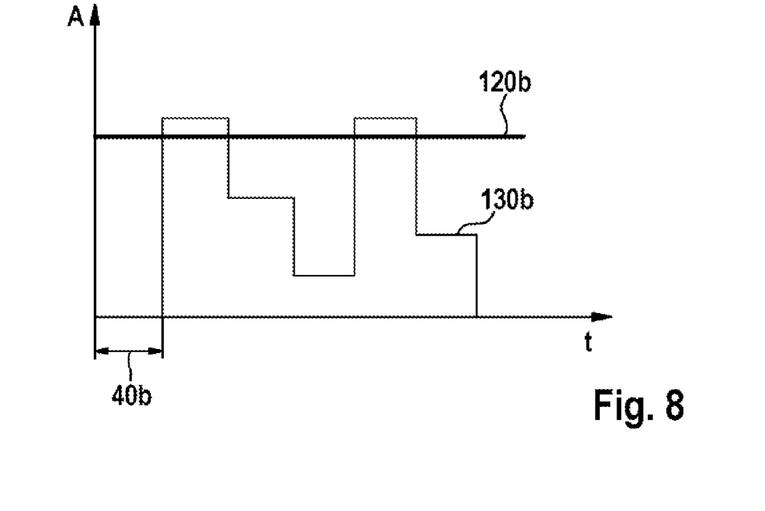
FIG. 8 shows a schematic representation of a signal characteristic of a sensor signal of the hand-held power tool of the second exemplary embodiment, integrated during a time interval.

FIG. 8 shows the sum 130b during respectively one time window 40b in the time characteristic. If a percussive impulse has occurred in the time window 40b, the value of the sum 130b is greater than the comparison signal 120b. In the time intervals that follow, the value drops in order, upon the next percussive impulse, to again assume a value that is greater than the comparison signal 120b. The height of the signal level of the comparison signal 120b can be set by the user such that the percussive operation is reliably detected in differing conditions.

Figure 9:
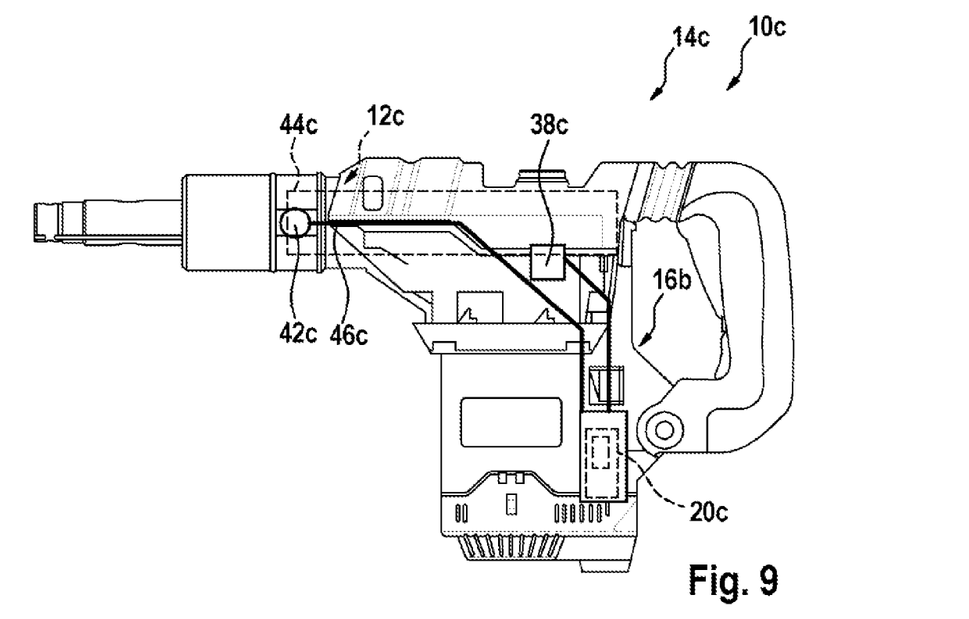
FIG. 9 shows a schematic representation of a hand-held power tool, comprising a percussion mechanism, which has a sensor unit that comprises a sensor and that comprises a further sensor for sensing a rotary position, in a third exemplary embodiment.

FIG. 9 shows a hand-held power tool 10c comprising a percussion mechanism 12c, which is realized as a percussion hammer 14c, having a sensor unit 16c that comprises a sensor 42c for a mechanical measured quantity, which sensor unit is provided to detect a percussion characteristic quantity, in a third exemplary embodiment. The hand-held power tool 10c differs from the hand-held power tool 10a of the first exemplary embodiment, in particular, in that the sensor 42c is disposed on a hammer tube 44c. Vibrations caused by percussive impulses can be measured particularly effectively here. A sensor 38c is provided to sense a rotary position of an eccentric, not represented in greater detail here. In particular, an expected percussion instant and an expected percussion frequency can be determined by means of the sensor 38c. The sensor 38c is realized as a Hall sensor, and senses an approach of a magnetized region of the eccentric, not represented in greater detail. A filter unit 20c differs from the filter unit 20a of the first exemplary embodiment in that the filter unit 20c processes a sensor signal 46c by means of a Fourier transformation. The filter unit 20c performs the Fourier transformation with a known, expected percussion frequency, which is determined by means of the sensor 38c. If a result of the Fourier transformation exceeds a comparison value of a comparison curve, in a frequency band determined by the percussion frequency, a percussive impulse is signaled.

Figure 10:
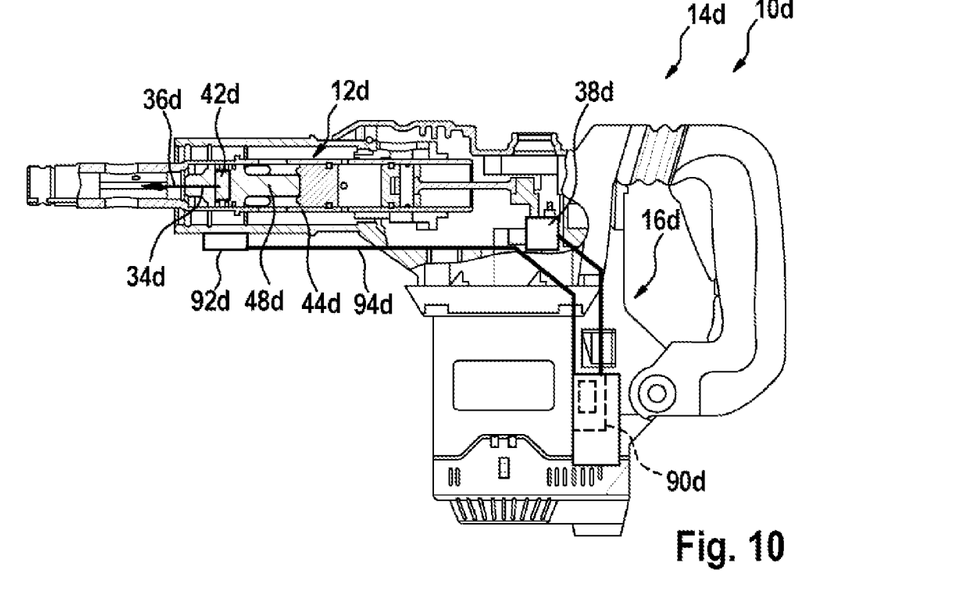
FIG. 10 shows a schematic representation of a hand-held power tool, comprising a percussion mechanism, which has a sensor unit that comprises a sensor and that comprises a further sensor for sensing a rotary position, in a fourth exemplary embodiment.

FIG. 10 shows a hand-held power tool 10d comprising a percussion mechanism 12d, which is realized as a percussion hammer 14d, having a sensor unit 16d that comprises a sensor 42d for a mechanical measured quantity, which sensor unit is provided to detect a percussion characteristic quantity, in a fourth exemplary embodiment. The hand-held power tool 10d differs from the hand-held power tool 10a of the first exemplary embodiment, in particular, in that the sensor 42d is disposed in a striking pin 48d. Vibrations caused by percussive impulses can be measured particularly effectively here. The sensor 42d is realized as a force sensor, in particular as a piezoelectric sensor. The sensor 42d has a measuring direction 34d in the percussion direction 36d. A measurement sensitivity of the sensor 42d has a maximum in the measuring direction 34d. The sensor 42d is connected to a signal processing unit 90d by means of a wireless signal connection. The wireless signal connection has an air-core coil 92d, which is disposed on a hammer tube 44d and which is connected to the signal processing unit 90d via an electrical signal line 94d. A sensor 38d is provided to sense a rotary position of an eccentric, not represented in greater detail here. In particular, an expected percussion instant and an expected percussion frequency can be determined by means of the sensor 38d. The percussion characteristic quantity can be detected in a particularly reliable manner by means of the sensor 42d directly in the flux of force of the percussive impulses generated by the percussion mechanism 12d.

Figure 11:
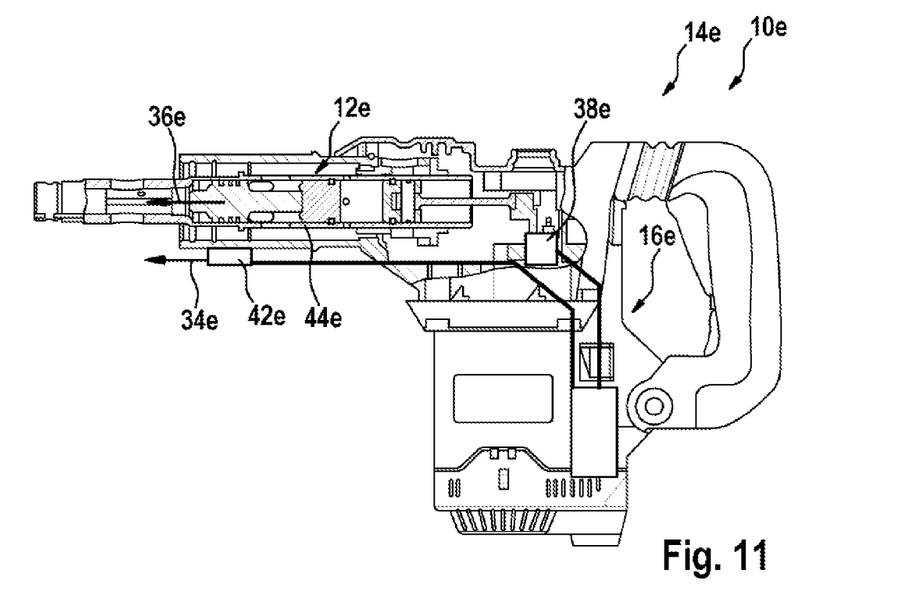
FIG. 11 shows a schematic representation of a hand-held power tool, comprising a percussion mechanism, which has a sensor unit that comprises a sensor and that comprises a further sensor for sensing a rotary position, in a fifth exemplary embodiment.

FIG. 11 shows a hand-held power tool 10e comprising a percussion mechanism 12e, which is realized as a percussion hammer 14e, having a sensor unit 16e that comprises a sensor 42e for a mechanical measured quantity, which sensor unit is provided to detect a percussion characteristic quantity, in a fifth exemplary embodiment. The hand-held power tool 10e differs from the hand-held power tool 10a of the first exemplary embodiment, in particular, in that the sensor 42e is disposed on a hammer tube 44e. Vibrations caused by percussive impulses can be measured particularly effectively here. The sensor 42e is realized as a strain sensor. The sensor 42e has a measuring direction 34e in the percussion direction 36e, and measures deformations of the hammer tube 44e in the percussion direction 36e. The deformations are caused, in particular, by percussive impulses. A sensor 38e is provided to sense a rotary position of an eccentric, not represented in greater detail here. In particular, an expected percussion instant and an expected percussion frequency can be determined by means of the sensor 38e. The percussion characteristic quantity can be detected in a particularly reliable manner by means of the sensor 42e directly on the hammer tube 44e.

Figure 12:
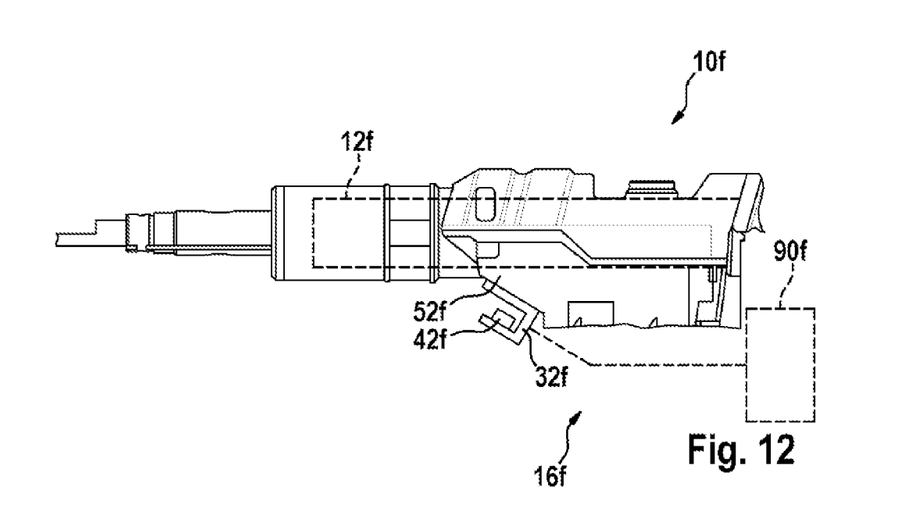
FIG. 12 shows a schematic representation of a sensor carrier of a hand-held power tool, comprising a percussion mechanism that has a sensor unit, in a sixth exemplary embodiment.

FIG. 12 shows a portion of a hand-held power tool 10f comprising a percussion mechanism 12f, in a sixth exemplary embodiment. A sensor unit 16f has a sensor 42f and a signal processing unit 90f. The sensor 42f is attached to a transmission housing 52f, by means of a sensor carrier 32f that has a natural frequency matched to a percussion characteristic quantity to be detected. The natural frequency is selected such that it is excited, in particular, by accelerations caused by percussive impulses of a striker, not represented here. The sensor carrier 32f amplifies these accelerations, such that they act with a greater amplitude upon the sensor 42f.

Figure 13:
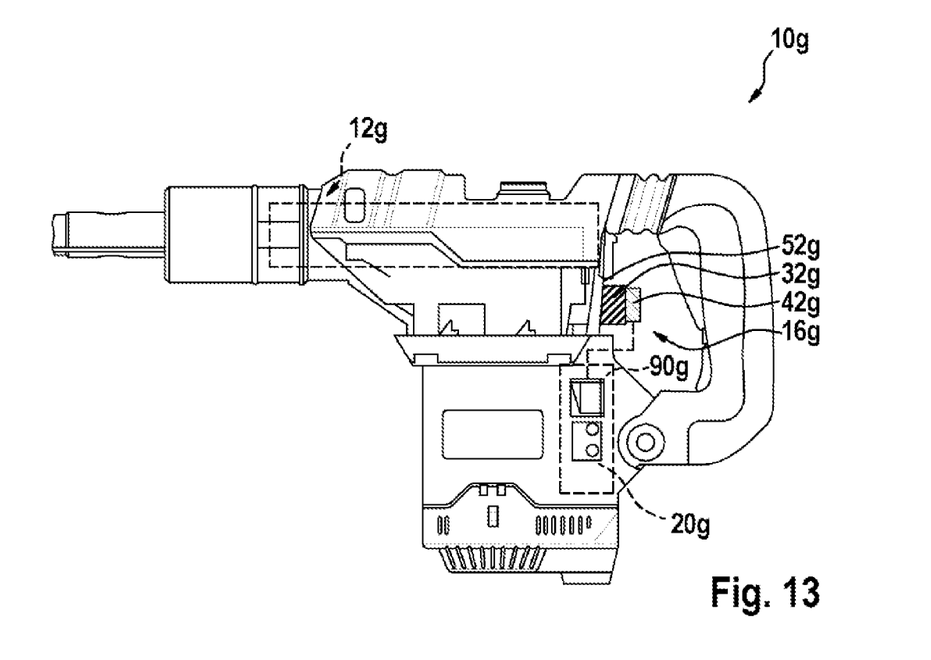
FIG. 13 shows a schematic representation of a sensor carrier of a hand-held power tool, comprising a percussion mechanism that has a sensor unit, in a seventh exemplary embodiment.

FIG. 13 shows a hand-held power tool 10g comprising a percussion mechanism 12g, in a seventh exemplary embodiment. A sensor unit 16g has a sensor 42g and a signal processing unit 90g. The sensor 42g is attached to a transmission housing 52g by means of a sensor carrier 32g. The sensor carrier 32g is provided to effect low-pass filtering of a mechanical measured quantity to be measured by the sensor 42g. For this purpose, in the exemplary embodiment, the sensor carrier 32g is made of an elastomer. The elastomer is selected such that accelerations having a frequency of more than 100 Hz are transmitted only with a high degree of damping to the sensor 42g, by the sensor carrier 32g. The sensor 42g can directly sense, in particular, accelerations caused by a percussion frequency in a range of 20-50 Hz.

The invention claimed is:

1. A hand-held power tool comprising:
a percussion mechanism mounted in a transmission housing of the hand-held power tool, the percussion mechanism including a gear mechanism that rotates to drive a piston in a percussion direction along a predetermined axis to apply percussive impulses to a striker and a striker pin along the predetermined axis, the transmission housing being partially encompassed by a housing of the hand-held power tool; and
a control unit mechanically connected to the transmission housing in the hand-held power tool, the control unit including:
at least one sensor unit having at least one acceleration sensor, the at least one acceleration sensor being configured to measure an acceleration that is transmitted to the at least one sensor unit through the transmission housing, the at least one sensor unit being configured to detect at least one percussion characteristic quantity, the acceleration sensor being disposed directly on a signal processing unit that is part of the control unit, wherein the at least one sensor unit is disposed between the transmission housing and the housing of the hand-held power tool, wherein the control unit is configured to:
  identify commencement of operation in a percussion mode from an idling mode based on the at least one percussion characteristic quantity detected by the at least one sensor unit; and
  select a working value of a rotational speed for the gear mechanism in the percussion mechanism that is higher than a limit value for the idling mode of the percussion mechanism in response to detection that the percussion mechanism is changed from the idling mode to the percussion mode,
wherein the at least one percussion characteristic quantity includes (i) an expected percussion frequency corresponding to an expected frequency with which the percussion mechanism exerts percussive impulses in the percussion mode in response to known operating parameters, and (ii) an expected percussion instant corresponding to an instant in which the percussion mechanism is expected to exert a percussive impulse in response to the known operating parameters.

2. The hand-held power tool as claimed in claim 1, wherein one of the at least one sensor unit has at least one filter unit configured to isolate a signal component from a sensor signal.

3. The hand-held power tool as claimed in claim 2, wherein one of the at least one filter unit has an analog filter.

4. The hand-held power tool as claimed in claim 2, wherein one of the at least one filter unit has a digital filter.

5. The hand-held power tool as claimed in claim 2, wherein one of the at least one filter unit is configured to process the sensor signal using of a Fourier transformation.

6. The hand-held power tool as claimed in claim 1, wherein one of the at least one sensor unit has at least one sensor carrier integrated with the transmission housing, the at least one sensor carrier having at least one natural frequency matched to the at least one percussion characteristic quantity to be detected.

7. The hand-held power tool as claimed in claim 1, wherein a measuring direction of the at least one acceleration sensor of the at least one sensor unit is disposed substantially axially in relation to the percussion direction.

8. The hand-held power tool as claimed in claim 1, wherein one of the at least one sensor unit has at least one sensor configured to measure a rotary position of the gear mechanism.

9. The hand-held power tool as claimed in claim 8, wherein one of the at least one sensor unit is configured to detect the at least one percussion characteristic quantity during a time window that is dependent on the rotary position.

10. The hand-held power tool as claimed in claim 1, wherein the control unit is further configured to:
  detect that the percussion mechanism is operating in the idling mode based on the at least one percussion characteristic quantity detected by the at least one sensor unit; and
  select another working value of the rotational speed for the gear mechanism in the percussion mechanism that is lower than the limit value to enable the commencement of operation of the percussion mechanism in the percussion mode in response to detection that the percussion mechanism is operating in the idling mode.

11. The hand-held power tool of claim 1, wherein the control unit is carried on the transmission housing.

12. The hand-held power tool of claim 1, wherein:
  in the idling mode a percussive operation is uncommenced, and
  in the percussion mode the percussive operation is commenced.

13. A method for detecting a percussion characteristic quantity of a hand-held power tool comprising:
  operating a percussion mechanism mounted in a transmission housing of the hand-held power tool, the percussion mechanism including a gear mechanism that rotates to drive a piston in a percussion direction along a predetermined axis to apply percussive impulses to a striker and a striker pin along the predetermined axis;
  detecting, with a sensor unit connected to the transmission housing in the hand-held power tool, at least one percussion characteristic quantity corresponding to at least one of an expected percussion frequency and an expected percussion instant during the operating of the percussion mechanism;
  identifying, with a control unit in the hand-held power tool, commencement of operation in a percussion mode from an idling mode based on based on the at least one percussion characteristic quantity; and
  selecting, with the control unit, a working value of a rotational speed for the gear mechanism in the percussion mechanism that is higher than a limit value for the idling mode of the percussion mechanism in response to detection that the percussion mechanism is changed from the idling mode to the percussion mode,
wherein the at least one percussion characteristic quantity includes (i) an expected percussion frequency corresponding to a frequency with which the percussion mechanism exerts percussive impulses in the percussion mode in response to known operating parameters, and (ii) an expected percussion instant corresponding to an instant in which the percussion mechanism is expected to exert a percussive impulse in response to the known operating parameters.

14. A pneumatically-driven rotary or percussion hammer hand-held power tool comprising:
  a power tool housing;
  a transmission housing at least partially encompassed by the power tool housing;
  a percussion mechanism mounted in the transmission housing and including:
    a pneumatically-driven gear mechanism,
    a piston,
    a striker, and
    a striker pin,
    wherein the gear mechanism is configured to be driven at a rotational speed to drive the piston in a percussion direction along a predetermined axis to apply percussive impulses to the striker and the striker pin along the predetermined axis; and
  a control unit including:
    a signal processing unit, and
    at least one sensor unit including at least one acceleration sensor configured to measure an acceleration transmitted to the at least one sensor unit through the transmission housing, the at least one sensor unit further configured to detect at least one percussion characteristic quantity, the at least one acceleration sensor disposed directly on the signal processing unit, wherein the at least one sensor unit is disposed between the transmission housing and the power tool housing, and wherein the control unit is configured to:

identify commencement of operation in a percussion mode from an idling mode based on the at least one percussion characteristic quantity detected by the at least one sensor unit, select a working value of a rotational speed for the gear mechanism that is higher than a limit value for the idling mode of the percussion mechanism in response to detection that the percussion mechanism is changed from the idling mode to the percussion mode, and operate the gear mechanism at only the selected working value of the rotational speed during the percussion mode.

15. The pneumatically-driven rotary or percussion hammer hand-held power tool of claim 14, wherein:

in the idling mode a percussive operation is uncommenced, and in the percussion mode the percussive operation is commenced.

\* \* \* \* \*